United States Patent [19]

Boah et al.

[11] Patent Number: 4,953,511
[45] Date of Patent: Sep. 4, 1990

[54] CORROSION RESISTANT LIQUID HEATING MODULE

[75] Inventors: John K. Boah, Manlius; Charles T. Cooney, Jr., Syracuse; Stephen A. Schoch, Clay; Howard W. Sibley, Baldwinsville, all of N.Y.

[73] Assignee: Carrier Corporation, Syracuse, N.Y.

[21] Appl. No.: 454,886

[22] Filed: Dec. 22, 1989

[51] Int. Cl.$^5$ ............................................. F22B 5/02
[52] U.S. Cl. ............................... 122/18; 122/14; 122/134; 122/261; 122/DIG. 13; 165/133
[58] Field of Search ............... 122/DIG. 13, 18, 14, 122/150 R, 261, 134; 165/133

[56] References Cited

U.S. PATENT DOCUMENTS

| | | | |
|---|---|---|---|
| 4,089,303 | 5/1978 | Brulfert | 122/250 R |
| 4,425,875 | 1/1984 | Marran | 122/261 X |
| 4,461,347 | 7/1984 | Layton et al. | 165/133 |
| 4,655,174 | 4/1987 | Fillios | 122/261 |
| 4,738,307 | 4/1988 | Bentley | 165/133 |
| 4,901,677 | 2/1990 | Demetri | 122/250 X |

Primary Examiner—Edward G. Favors
Attorney, Agent, or Firm—Charles E. Adams

[57] ABSTRACT

A condensing heating module for heating a fluid and adapted for use with a radiant infrared burner. The heat exchanger within the module is spirally disposed about a central burner cavity and has a fluid flow passage of serpentine shape formed within its wall. The upper and lower surfaces of the module, together with the spiral wall of the heat exchanger, form a spiral condensing flue leading from the central burner cavity to an external flue. Those portions of the spiral heat exchanger wall and the module upper and lower surfaces which are exposed to direct radiation from the burner are formed of a corrosion resistant steel, while the remainder of the surfaces and wall are formed of carbon steel to which has been laminated a layer of polypropylene such that the polypropylene layer will be exposed to the flue gas and condensate environment and provide corrosion protection to the carbon steel.

3 Claims, 3 Drawing Sheets

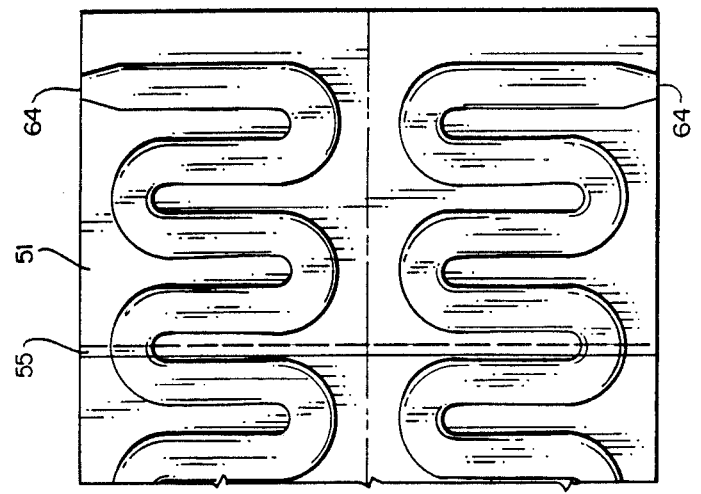
FIG. 4
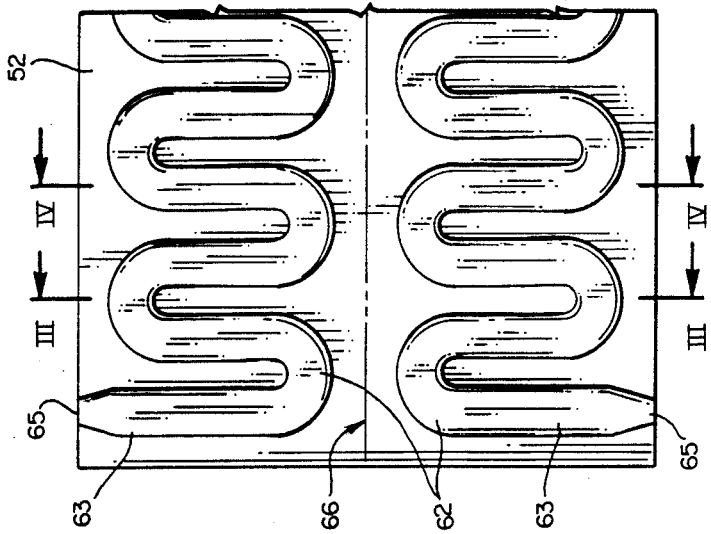
FIG. 5
FIG. 6

CORROSION RESISTANT LIQUID HEATING MODULE

BACKGROUND OF THE INVENTION

This invention relates generally to a condensing heating module adapted for use with a radiant infrared burner for heating a liquid. The heated liquid may be either a heat transfer fluid for use in a space heating system, or water for general domestic or other hot water service. In particular, the invention relates to a heating module which is adapted for use where the condensed and corrosive combustion products formed by a gas or oil-fired burner are present.

Environmental and economic considerations have led to numerous attempts to produce space and water heating systems of increased thermal efficiency. One method for increasing efficiency in a gas or oil-fired heating system is to capture the heat contained in the combustion gases, heat which is lost "up the flue" in conventional systems. Increases in system thermal efficiency are attained by cooling the flue gases produced by the burner, while the gases are still in the system, to a temperature below the dew point of the gases, thus recovering a portion of the latent heat of vaporization as usable heat energy. This is generally accomplished in a liquid heating system by using the cooler liquid entering the heating system to cool the flue gases while at the same time the gases preheat the liquid. Thermal efficiencies in such condensing systems can be in excess of 90 percent.

A simple and economical method of fabrication for producing a heat exchanger is to stamp and assemble two metal sheets together such that a gas flow path is formed between the connected sheets. Heat exchangers fabricated in this manner are termed clamshell heat exchangers and are widely found in conventional heating systems, especially in furnaces. Heat exchangers in such applications are generally made of carbon steel.

The condensate produced from flue gases in a condensing heating system contains a number of corrosive compounds, including sulfuric, hydrofluoric, and hydrochloric acids. Concentrations of as little as ten parts per million of these corrosive agents may severely corrode carbon steel and pit aluminum and copper. The materials used to fabricate components exposed to the corrosive environment in a condensing system must therefore be different and more corrosion resistant than those used in conventional applications. The ideal material or materials used to fabricate such components should have good heat transfer characteristics, adequate strength with minimum thickness, be resistant to chemical attack and be low in acquisition and manufacturing cost. Condensing heat exchangers are now typically fabricated of corrosion resistant steels such as stainless steels in the 300 series. These steels possess most of the attributes of the ideal material but are relatively costly. There have been efforts made to fabricate components of carbon steel coated with a corrosion resistant material, but coatings applied in a liquid or powder form perform poorly, blister, crack or spall during the fabrication process and subject the carbon steel base metal to localized corrosion.

SUMMARY OF THE INVENTION

It is an object of the present invention to produce a condensing heating module for heating a liquid that is both corrosion resistant and relatively inexpensive.

Another object of the invention is to provide a corrosion resistant heating module that employs, to the maximum extent possible, a layer of corrosion resistant plastic material on surfaces of the module exposed to corrosive flue gas condensate.

A further object of the invention is to produce a condensing heating module of a high degree of reliability.

A still further object of the invention is to produce a heating module in which a protective coating, resistant to damage during fabrication and operation of the module, is applied to those components of the module which are subjected to attack by corrosive agents but not subjected to excessively high temperatures.

These and other objects of the invention are attained by a design for a condensing heating module for heating a liquid and adapted for use with a radiant infrared burner as well as by a method for fabricating the module. The module comprises an enclosure containing a heat exchanger, formed by stamping and folding a single sheet of metal, spirally disposed about a central burner cavity. The heat exchanger together with the lower tray and the upper cover of the module, form a spiral condensing flue path which leads to an external exhaust flue located on the outer perimeter of the module. Liquid to be heated enters the module and passes through a serpentine fluid flow passage formed by stamping a flow path in a wall of the heat exchanger. The liquid is preheated by flue gases in the condensing flue and heated by the radiant burner before leaving the module. Those portions of the heat exchanger surface, the upper cover and lower tray that receive direct radiation from the burner are constructed of corrosion resistant steel while those portions that do not receive direct radiation are constructed of galvanized carbon steel laminated with a coating of polyolefin, e.g. polypropylene plastic. The lower tray is fitted with a drain to remove condensate from the module. The features of novelty which characterize the invention are enumerated in the claims which are a part of this specification. The drawings and descriptive matter which illustrate and explain a preferred embodiment of the inventions will provide an understanding of the invention, its advantages and the objects attained by its use.

BRIEF DESCRIPTION OF THE DRAWINGS

The accompanying drawings form a part of the specification. Throughout the various drawings, like reference numbers designate like, corresponding or similar parts.

FIG. 4 is a plan view of a metal sheet stamped to form the mirror image portions of the serpentine liquid flow passage in the heat exchanger of the heating module, but not yet folded and joined to complete the formation of the flow passage.

FIG. 5 is a view of the cross section of the metal sheet shown in FIG. 4 along line III—III. FIG. 6 is a view of the cross section of the metal sheet shown inn FIG. 4 along line IV—IV.

DESCRIPTION OF THE PREFERRED EMBODIMENTS

Figure 1:
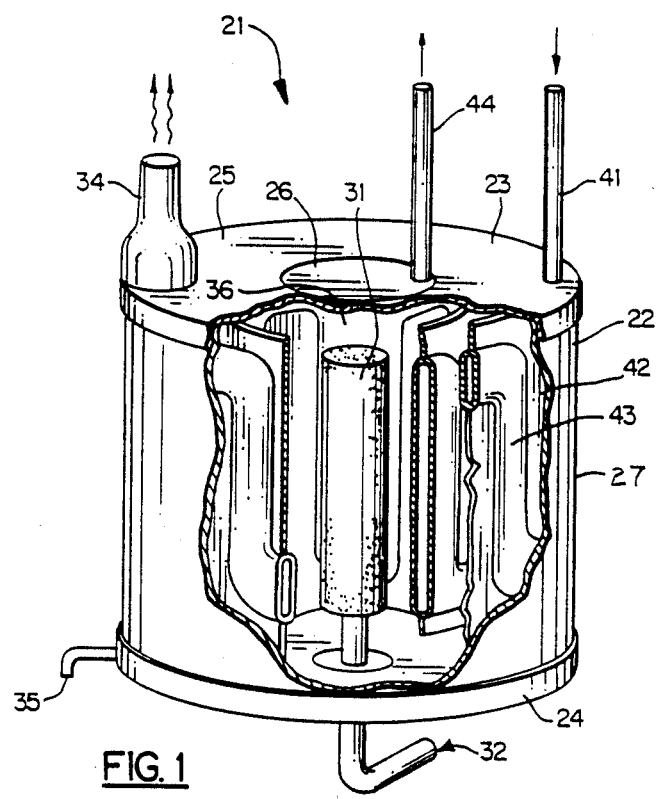
FIG. 1 is a three dimensional view, partly broken away, of a heating module constructed according to the teaching of the present invention.

FIG. 1 depicts a three dimensional view, partly broken away, of a heating module constructed according to the principles of the present invention. The major components of the module 21 are an enclosure 27 having an outer wall 22, an upper cover 23, a lower tray 24 and a heat exchanger 42 spirally disposed within the enclosure. The innermost loop of the spiral heat exchanger 42 forms a central burner cavity 36 within which is a radiant infrared burner 31. The burner 31 burns a combustible gas comprising a mixture of fuel gas and air supplied to it through a combustible gas supply 32. Not shown in the figures are conventional accessories to the module such as a fuel gas regulating valve, a fuel gas and air mixing means and ignition and safety devices. Combustion gases produced by the burner 31 flow from the central burner cavity 36 through a spiral flue gas passage 33 formed by the heat exchanger 42, the upper cover 23 and the lower tray 24 and exit the module through an external flue 34. Flow of combustion gases through and out of the module may be effected by an induction blower, not shown, mounted external to and downstream in the combustion gas flow path from the module 21 or by a blower, not shown, mounted external to and upstream in the combustible gas supply to the module.

Liquid, which may be either water, as in a hot water service system, or some other heat transfer fluid, such as a mixture of water and glycol, enters the module 21 through inlet pipe 41 and into a serpentine liquid flow passage 43 in the heat exchanger 42. Liquid flow may be the result of an external pump, not shown, or the pressure in a water supply line such as a residence water service supply, not shown. The liquid flows through the flow passage 43 in the heat exchanger 42, where it is first preheated by the hot gases of combustion flowing through the flue gas passage 33, at the same time condensing those gases, and then is heated by radiant heat from the infrared burner 31 before exiting the module through a liquid outlet pipe 44. Liquid condensate drains from the module through condensate drain 35.

FIGS. 2,3,4,5 and 6 show details of the module.

Figure 2:
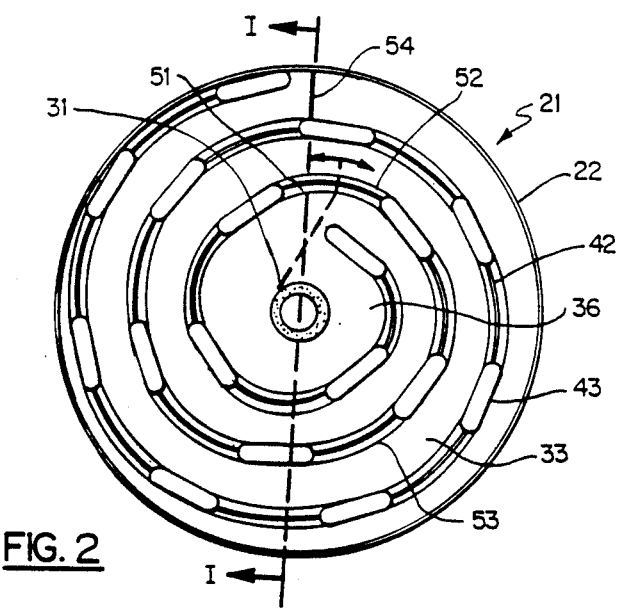
FIG. 2 is a view of a cross section of the heating module shown in FIG. 3 taken along line II—II.
Figure 3:
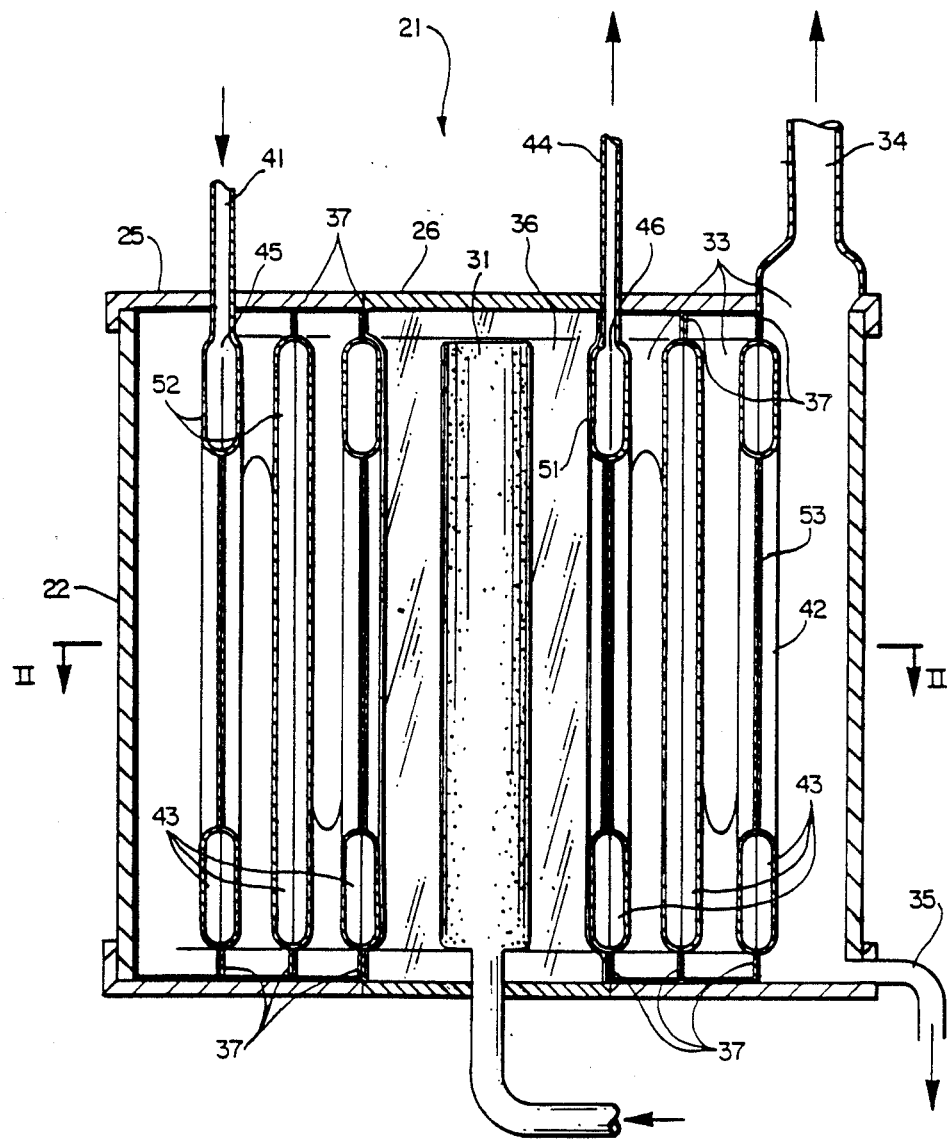
FIG. 3 is a view of a cross section of the heating module shown in FIG. 2 taken along line I—I.

FIG. 2 is a cross sectional plan view of the heating module 21 taken across the line II—II in FIG. 3. It shows the heat exchanger 42 spirally disposed the module 21. The innermost loop of the spiral heat exchanger 42 forms the central burner cavity 36, within which is located the radiant infrared burner 31. The space between the adjacent loops of the heat exchanger 42 form a flue gas passage 33 leading from the central burner cavity 31 to the outer perimeter of the module where the gases exit through an external flue 34 (not shown in this figure). Liquid to be heated flows through the module in the fluid flow passage 43 in the heat exchanger 42. The heat exchanger 42 has two sections. A first section 51, comprising the innermost part of the heat exchanger 42 which is exposed to direct heat radiation from the burner 31, is fabricated of a corrosion resistant steel. A second section 52, comprising the outermost part of heat exchanger 42 which does not receive direct radiation from the burner 31, is not subjected to the high temperatures experienced by the innermost section 51, is fabricated of a galvanized carbon steel, one side of which has been laminated with a coating 53 of a plastic such as polypropylene. The coating should be thick enough to withstand the fabrication process and the environment inside the module while the module is in operation, but not so thick, generally not more than 0.006 inches, as to offer excessive resistance to heat transfer across the coating. The coating is laminated to that side of the heat exchanger 42 which is exposed to the corrosive liquid condensate formed in the flue gas passage 33. The flue gas passage terminal plate 54 may be fabricated together with the module outer wall 22 from a single piece of galvanized sheet carbon steel. Since the outer wall 22 is not in contact with the corrosive flue gas condensate only that portion of the steel piece which forms the terminal plate 54 is laminated with a plastic coating.

FIG. 3 is a cross sectional elevation view of the heating module taken across the line I—I in FIG. 2 and shows further details of the module 21. Liquid inlet 41 joins heat exchanger 42 at a transition 45. Similarly heat exchanger 42 joins liquid outlet 44 at a transition 46. Those sections 26 of both the upper cover 23 and lower tray 24 of the module enclosure which receive direct heat radiation from burner 31 are fabricated of corrosion resistant steel, while the remaining sections 25 of the cover 23 and tray 24 are fabricated of galvanized carbon steel to the inner surface of which has been laminated a coating of a plastic such a polypropylene. The joints 37 between the heat exchanger 42 and the upper cover 23 and lower tray 24 are fixed and made gas tight by a suitable means such as ultrasonic welding or use of an appropriate adhesive.

The heat exchanger 42 is manufactured from a single flat sheet metal blank. FIG. 4 illustrates the method of manufacturing the heat exchanger by showing it at an intermediate stage of fabrication. The blank 61 comprises a corrosion resistant steel section 51 and a galvanized carbon steel section 52 joined at a joint 55 to form the blank 61 by an appropriate process such as ultrasonic welding. A thin, not more than 0.006 inch, coating of a plastic material such as polypropylene is laminated to one side of the carbon steel section 52.

In FIG. 4, the blank 61 has been stamped to form an unfolded liquid flow passage pattern 62. The term unfolded in this context means an open pattern of two mirror image portions 63 that must be folded together to form the serpentine liquid flow passage (43 in FIGS. 1, 2 and 3) in the completed heat exchanger. Each mirror image portion 63 comprises one half of the completed liquid flow passage including halves of the inlet transition 64 and outlet transition 65. The blank 61 is stamped so that the raised portion of the pattern 62 is on the side of the blank to which has been laminated the plastic coating. If, however, potable water is used in the heat exchanger 42 it may be necessary to coat both sides of the galvanized carbon steel section 52 with the plastic coating.

Fold line 66 divides the blank 61 into two halves, each containing one of the two mirror image portions 63. After stamping, the blank 61 is folded along fold line 66 so that the plastic coating laminated to the carbon steel portion 52 of the blank is on the outside of the folded blank 61. The folded blank 61 forms the heat exchanger 42 depicted in FIGS. 1, 2 and 3.

FIGS. 5 and 6 show cross sectional views, taken along the lines III—III and IV—IV in FIG. 4 respectively, of the unfolded liquid flow passage pattern 62 as it has been stamped into the blank 61. Since the cross sections have been taken across the carbon steel portion of the blank, the plastic coating 53 is also seen in those figures.

Referring again to FIG. 4, the final steps in forming blank 61 into heat exchanger 42 are to join the two mirror image portions 63 together by a suitable means such as ultrasonic welding so that the fluid flow passage formed is fluid tight and then to form the heat exchanger into a spiral.

The above description is of a preferred embodiment of the present invention. One skilled in the art may apprehend various modifications and other embodiments of the invention. For example, galvanized carbon steel sheet is described in this embodiment as an appropriate material for fabricating those components of the module which do not receive direct heat radiation from the infrared burner. Those components, of course, could also be fabricated of other relatively inexpensive metals such as aluminum, copper or low alloy ferritic stainless steel. Therefore it should be understood that although the present invention has been described in conjunction with a particular embodiment, various embodiments and modifications may be made while remaining within the scope of the below claims.

What is claimed is:

1. A condensing heating module for heating a fluid adapted for use with a radiant infrared burner comprising:
    an enclosure having a clamshell heat exchanger spirally disposed about a central burner cavity and an external flue for gases of combustion produced by said burner to exit said module;
    said heat exchanger having an inlet for fluid to be heated to enter and an outlet for heated fluid to exit;
    said heat exchanger having a corrosion resistant metal section coextensive with said central burner cavity and a noncorrosion resistant metal section; and
    a coating of a corrosion resistant plastic material bonded to said noncorrosion resistant metal section of said heat exchanger.

2. A condensing fluid heating module as in claim 1 in which said corrosion resistant material is polypropylene.

3. A condensing fluid heating module as in claim 2 in which said polypropylene has a thickness of not more than 0.006 inches.

* * * * *